(12) United States Patent
Norton et al.

(10) Patent No.: US 11,964,388 B2
(45) Date of Patent: Apr. 23, 2024

(54) CONTINUUM ARM ROBOT

(71) Applicant: ROLLS-ROYCE plc, London (GB)

(72) Inventors: Andrew D Norton, Derby (GB); Matteo Russo, Nottingham (GB); Xin Dong, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/992,349

(22) Filed: Nov. 22, 2022

(65) Prior Publication Data
US 2023/0191630 A1 Jun. 22, 2023

(30) Foreign Application Priority Data
Dec. 21, 2021 (GB) ..................................... 2118604

(51) Int. Cl.
*B25J 18/00* (2006.01)
*B25J 19/00* (2006.01)

(52) U.S. Cl.
CPC ........... *B25J 19/0004* (2013.01); *B25J 18/00* (2013.01)

(58) Field of Classification Search
CPC ..... B25J 9/065; B25J 5/00; B25J 18/06; B25J 9/1005; B25J 9/10
See application file for complete search history.

(56) References Cited

U.S. PATENT DOCUMENTS

| | | | |
|---|---|---|---|
| 2007/0260114 A1 | 11/2007 | Miyamoto et al. | |
| 2015/0081092 A1 | 3/2015 | Jacobsen et al. | |
| 2016/0256227 A1 | 9/2016 | Markvicka et al. | |
| 2021/0402591 A1* | 12/2021 | Klassen | B25J 19/0029 |

FOREIGN PATENT DOCUMENTS

| | | | | |
|---|---|---|---|---|
| CN | 106239494 A | * | 12/2016 | |
| JP | H06-008163 A | | 1/1994 | |
| JP | H09-085671 A | | 3/1997 | |
| KR | 10-2010-0044405 A | | 4/2010 | |
| KR | 2020119457 A | * | 10/2020 | ....... A61B 17/00234 |

OTHER PUBLICATIONS

May 12, 2023 extended Search Report issued in European Patent Application No. 22208465.9.
Feb. 22, 2023 Search Report issued in British Patent Application No. GB2118604.4.
Neppalli, Srinivas et al., "Design, Construction, and Analysis of a Continuum Robot.", IEEE/RSJ International Conference on Intelligent Robots and Systems, (2017), pp. 1503-1507.
Jones, Bryan A. et al., "Kinematics for Multisection Continuum Robots.", . IEEE Transactions on Robotics, (2016), vol. 22, No. 1, pp. 43-55.

(Continued)

*Primary Examiner* — Gregory Robert Weber
(74) *Attorney, Agent, or Firm* — Oliff PLC

(57) ABSTRACT

A locking system for a continuum arm robot system, the robot system includes: a continuum arm robot having a manipulatable tip, a passive robot section through which controls for the manipulatable tip, and at least one ferromagnetic collar, and at least one external controllable electromagnetic device which can be activated so that the ferromagnetic section on the continuum arm robot is attracted to the electromagnetic device.

14 Claims, 4 Drawing Sheets

(56) References Cited

OTHER PUBLICATIONS

Figure 1A:
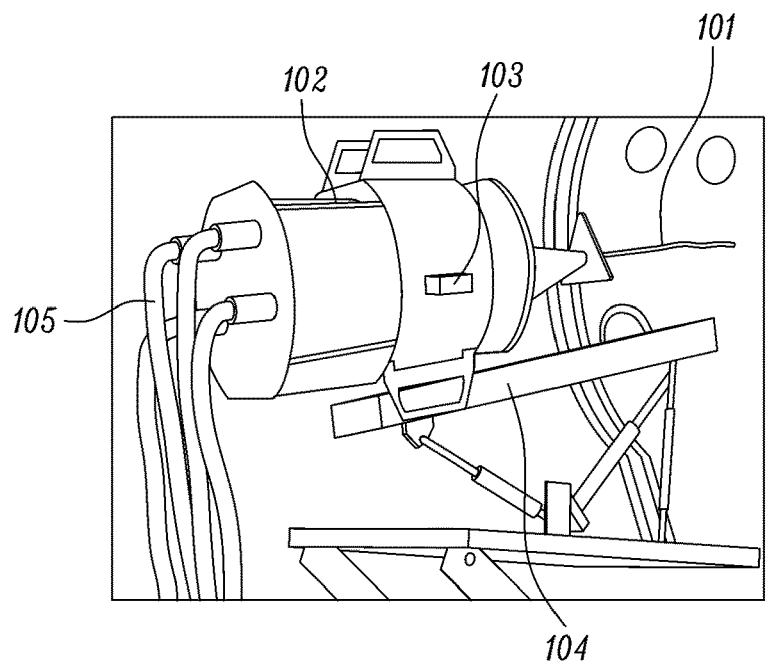

Hannan, Michael W. et al., "Kinematics and the Implementation of an Elephant's Trunk Manipulator and Other Continuum Style Robots.", Journal of Robotic Systems, (2003), vol. 20, No. 2, pp. 45-63.

Axinte, Dragos et al., "MiRoR-Miniaturized Robotic Systems for Holistic In-Situ Repair and Maintenance Works in Restrained and Hazardous Environments", IEEE/ASME Transactions on Mechatronics, (2018), vol. 23, No. 2, pp. 978-981.

Dong, X. et al., "Development of a slender continuum robotic system for on-wing inspection/repair of gas turbine engines.", Robotics and Computer-Integrated Manufacturing, (2017), vol. 44, pp. 218-229.

Wang, Mingfeng et al., "Design and Development of a Slender Dual-Structure Continuum Robot for In-Situ Aeroengine Repair.", IROS 2018—International Conference on Intelligent Robots, (2018), pp. 5648-5653.

Kim, Yong-Jae et al., "Design of a Tubular Snake-like Manipulator with Stiffening Capability by Layer Jamming.", IEEE/RSJ International Conference on Intelligent Robots and Systems, (2012), pp. 4251-4256.

* cited by examiner

CONTINUUM ARM ROBOT

This specification is based upon and claims the benefit of priority from UK Patent Application Number 2118604.4 filed on 21 Dec. 2021, the entire contents of which are incorporated herein by reference.

BACKGROUND

Overview of the Disclosure

The disclosure relates to a means of stiffening a continuum arm robot. In particular, the disclosure relates to a means of stiffening sections of continuum arm robots via means of ferromagnetic section on the robot and an electromagnetic device.

BACKGROUND OF THE DISCLOSURE

Continuum arm or snake arm robots are of growing interest in a number of applications. This is because the robots can be manipulated into spaces in which other robotic systems or human operators cannot readily access. This is due to the ability to manipulate the body with a number of degrees of freedom so that the end tool can be positioned accurately and easily. This positioning is controlled by actuators which manipulate the tendons within the robot so that each joint of the arm can be individually controlled to within a high degree of positional accuracy.

Most robotic arm systems have 6 degrees of freedom or less. However, if a task requires a greater amount of dexterity the number of degrees of freedom required is increased. This increase in the number of degrees of freedom means that the arms are able to operate in confined areas, for example in maintenance of complex structures or for use in minimally invasive surgery. Continuum arm robots are designed along two main paths: Firstly, there are snake-like robots, which consist of multiple rigid-link sections that are connected by either a rigid R/U/S (Revolute/Universal/Spherical) joints or by a compliant joint. Each section is composed of one or more segments and controlled independently from the others with on-board or remote actuation. Secondly, there are continuum robots, which consist of a compliant backbone whose local and global deformation is controlled by one or more actuators.

Despite the functionality there are issues with the current designs of highly compliant robots, which results from the number of joints required in the robot arm. As a consequence of these joints the robot arm suffers from a low degree of stiffness when compared to conventional 6 degrees of freedom robots. This reduced stiffness results in a reduced load carrying capacity as well reducing the interaction that the arm can have with the environment within which it is operating. The current state of the art aims to overcome this by "freezing" the system through locking the actuator or by the addition of stiffening means to the backbone. This can work for shorter length robotic arms, however, when employed on longer length robots the arms act like long cantilever beams and the deflection of the beams causes significant position and navigation issues. This limits the use of such robots to lightweight tasks for risk of damaging the robot and/or the object that the robot is working on. Therefore, there is a requirement for an improved continuum arm robot system to overcome these issues.

SUMMARY OF THE DISCLOSURE

The first aspect of the disclosure relates to a locking system for a continuum arm robot system, the robot system comprises:

a continuum arm robot having a manipulatable tip, a passive robot section through which controls for the manipulatable tip, and at least one ferromagnetic collar, and at least one external controllable electromagnetic device which can be activated so that the ferromagnetic section on the continuum arm robot is attracted to the electromagnetic device.

The ferromagnetic section may be a disc in the robots' spine.

The ferromagnetic section may be a collar.

The external controllable electromagnetic device may be positioned by an operator.

The external controllable electromagnetic device may be positioned by a further controllable robotic device.

The external controllable electromagnetic device may be located within a wall of a workspace into which the continuum arm robot is inserted to work.

The external controllable electromagnetic device may comprise a plurality of electromagnetic devices spaced apart and are individually addressable.

The electromagnetic devices may be addressed so that the switching on and off of the controllable electromagnetic devices provides a force that pulls the continuum arm robot section through a workspace by progressively switching the electromagnetic robots on, whilst turning the preceding ones off.

The ferromagnetic collars may be retrofitted onto a pre-existing continuum arm robot.

Both the continuum arm robot and/or the controllable electromagnetic devices may have sensors and feedback devices to assist in the positioning of the continuum arm robot and/or the activation of the controllable electromagnetic devices.

The collar may have a coating.

The coating may be Teflon.

A plurality of ferromagnetic collars may be positioned along the passive section of the continuum arm robot and a plurality of controllable electromagnetic devices, each collar associated with a controllable electromagnetic device so that that when the controllable electromagnetic devices are activated the passive section of the continuum arm robot is locked in multiple locations.

The controllable electromagnetic devices may be remotely controlled.

According to a second aspect of the disclosure there is provided a method of fixing a continuum arm robot according to any one of the preceding claims, the method comprising:

inserting the continuum arm robot into a workspace through an access port;

positioning the tip of the continuum arm robot close to an area within the workspace to be addressed;

activating the electromagnetic device to attract and lock the continuum arm against the wall of the workspace, performing the desired task with the continuum arm robot;

deactivating the electromagnetic device to release the continuum arm robot;

removing the continuum arm robot from the workspace.

The positioning may be performed by addressing a plurality of controllable electromagnetic devices, so that they are able to pull the continuum arm robot through the workspace to the desired location.

During positioning sensors and feedback devices may be used to ensure the continuum arm robot is in the correct position prior to activating the electromagnetic devices.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DISCUSSION OF THE FIGURES

Figure 1B:
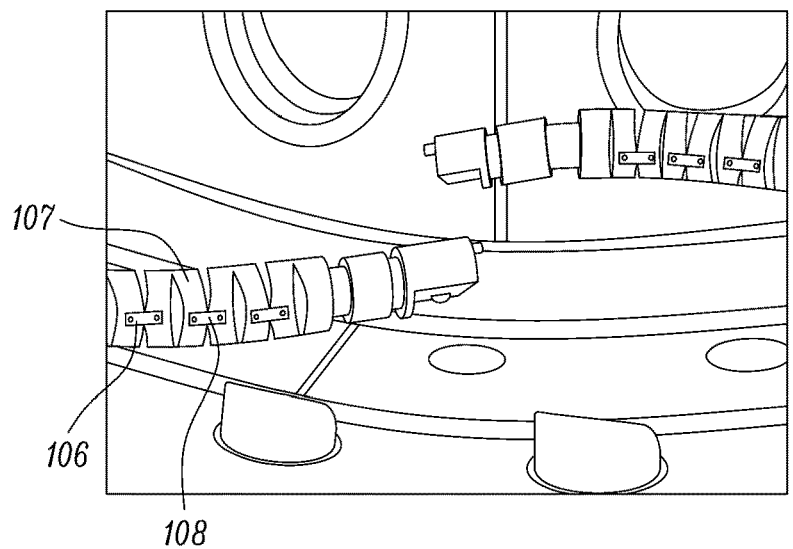
Figure 2:
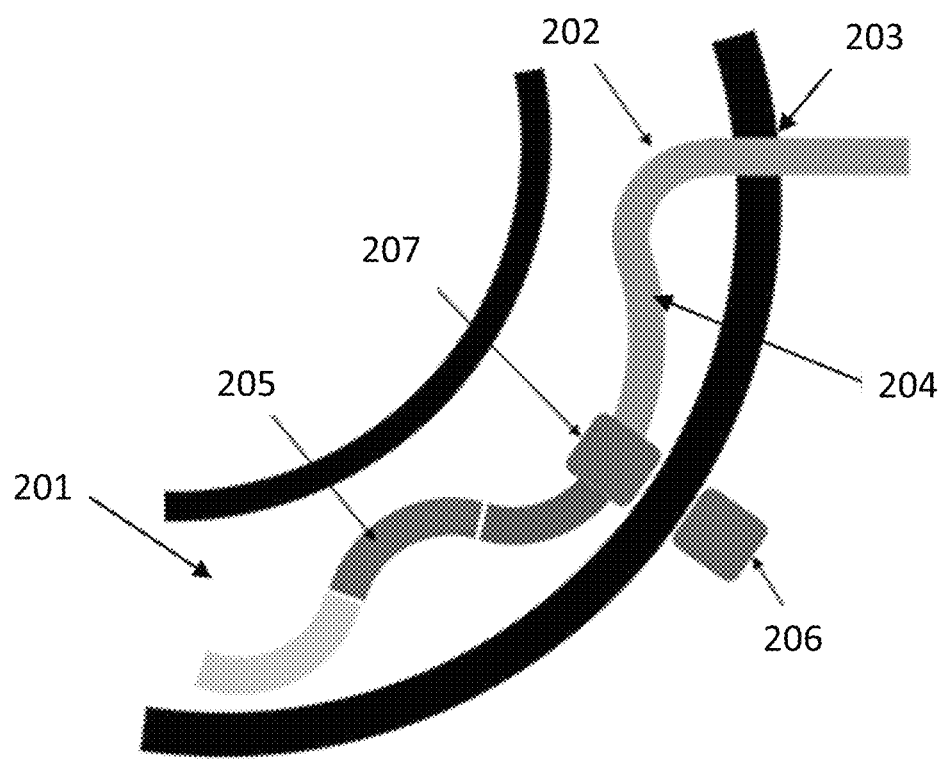
Figure 3:
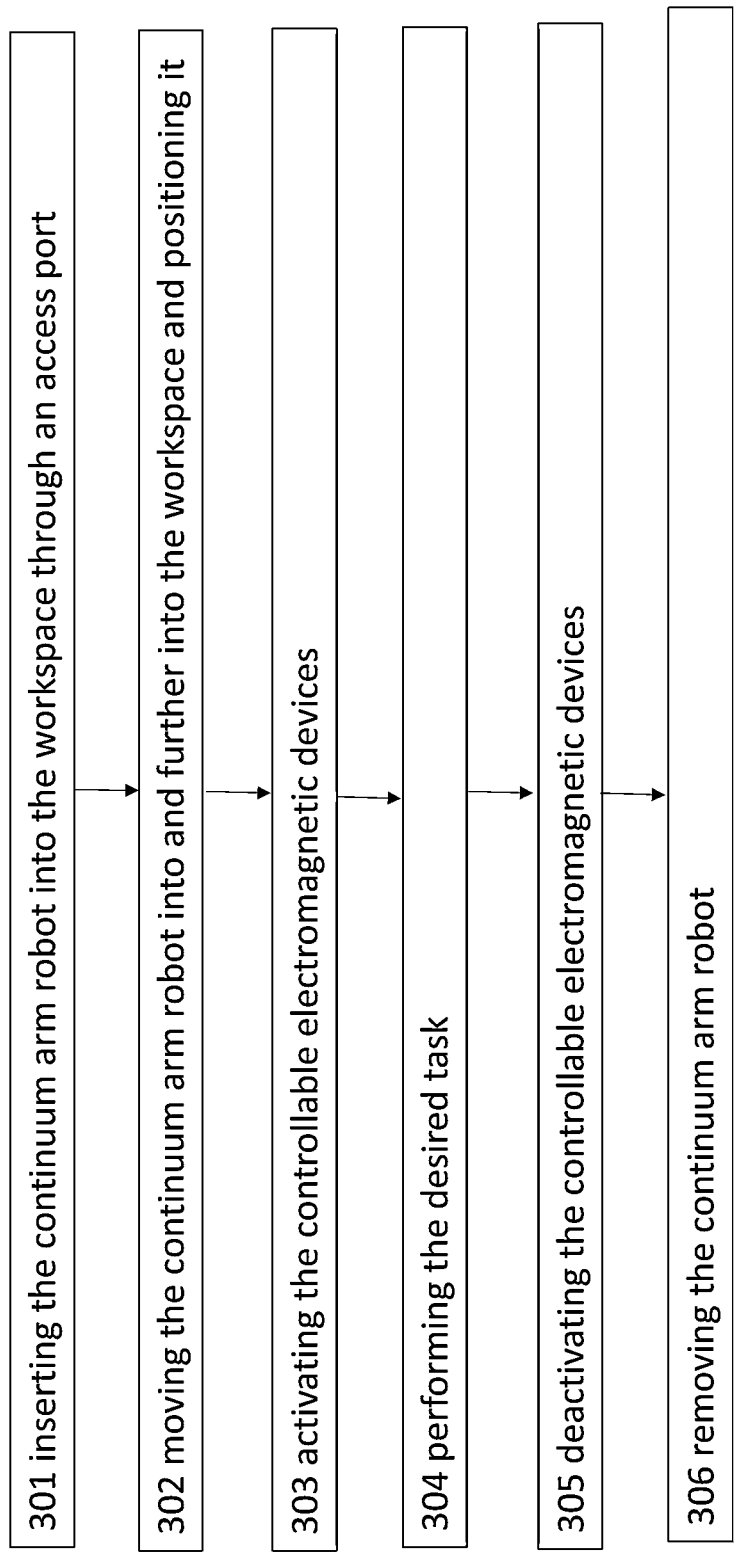
Figure 4:
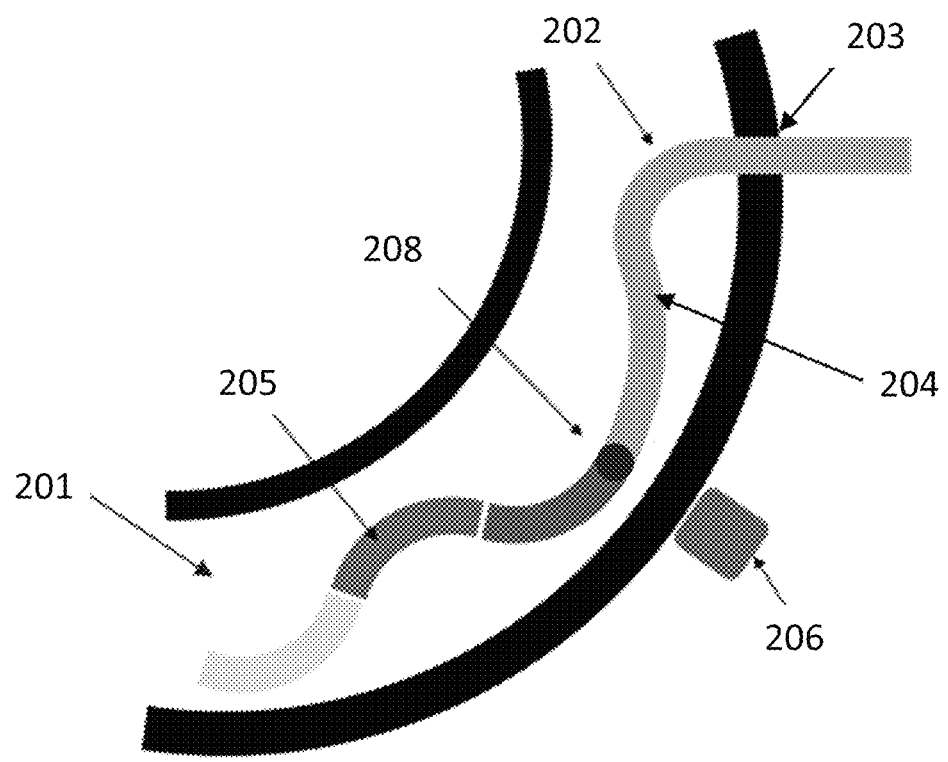

Embodiments will now be described by way of example only, with reference to the Figures, in which:

FIG. 1a presents a prior art example of a cut away of a continuum arm robot;

FIG. 1B presents an example of the joints of a continuum arm robot;

FIG. 2 presents an image of a compliant arm robot system according to the present disclosure;

FIG. 3 presents a flow chart of operation of the complaint robot according to the present disclosure; and FIG. 4 presents an image of another compliant arm robot system according to the present disclosure.

DETAILED DESCRIPTION OF THE DISCLOSURE

Aspects and embodiments of the present disclosure will now be discussed with reference to the accompanying figures. Further aspects and embodiments will be apparent to those skilled in the art.

FIG. 1a presents a prior art example of a cut away of a continuum arm robot. The prior art continuum arm robot comprises the continuum arm robot portion 101 permanently integrated and extending out from the actuator pack 102. The actuator pack 102 contains a plurality of independent actuators 103. These actuators are used to modulate the tension within the tendons that run through the continuum arm 101. The tendons are associated with joints within the arm; each of these joints is designed to move in response to a tensioning or relaxing of the tendon associated with the joint. This tensioning or relaxing of the tendon therefore causes a contraction or extension of the joint, which allows the continuum arm to bend. The actuator pack is shown being positioned on a rail or support 104, which is positioned close to the component to be inspected. The actuator is also provided with a plurality of power and signal cables 105 that are used to power and address the actuators. The individual signals across the range of actuators provide control of the joints such that the continuum arm 101 can be directed. Not shown in FIG. 1 is that there is also a need for an operator with a computing device that is linked to the actuator to control movement of the continuum arm and to perform the desired task. As the continuum arm is permanently integrated into the actuator pack if a different tool is required it requires the use of a complete continuum arm robot system including the actuator. The computing device that is connected to the prior art actuator may be any suitable computing system such as a laptop computer featuring the requisite operating software for the robot and a control input such as a joystick, which allows the continuum arm to be controlled.

FIG. 1b shows an example of the joints of a continuum arm robot. The arm comprises multiple joints, which require at least 2 cables per joint. For example, a system having three joints, each having 4 tendons per joint will require 12 actuators to drive. To increase the number of joints either the number of actuators needs to be increased or the number of tendons per joint needs to be reduced. Highlighted joints 106, 107, 108 are able to be manipulated to move in three dimensions. The joints are configured so that joints 106 and 108 are able to be able to flex in the same plane relative to the centre of the arm, whilst the plane that joint 107 is able to move in is offset by 90° to joints 106 and 108. It is through this repeating configuration of alternating joint angles, each of which results in the movement in different orthogonal plane, that allows the arm to be manipulated in three dimensions. Each joint within the arm has a limit to the amount they are able to flex; this is defined by the design of the arm and the materials that are used. The limit of flex in each joint sets characteristics such as the minimum bending radius and the requirements for the torque that is required to cause a resultant change within the joint. It is the presence of the space in the joints that allows the joint to move and the ease of movement of the joint that results in a low stiffness of the arms in comparison to other robotic arms of the same length. This is because the structural behaviour of a snake-like robotic manipulator can be compared to a cantilever beam under load; this is because the system is fixed on one end to the base with actuation pack and the remainder of the arm is used to navigate through the environment without other points of contact. In this condition, every load applied on the body and/or the tip of the snake-like robot, including its own weight, imposes a significant deflection from the ideal position. At the end of the arm there is positioned a tool or probe that is designed to perform one or more functions once the continuum arm is in position. The heads of the continuum arm robots are often provided with optical systems so that the operator is able to view the head as it is being inserted into the component and to be control the head as it performs its tasks. The optical system is also frequently coupled to an illumination system. The control cables for the tool, electrical power connectors to the illuminations system and optical cables usually are able to run through the centre of the joints within the continuum arm. This has the benefit of protecting the cables form any potential damage.

One of the issues with using such robots, as discussed above, is that although the large number of DoFs enables these robots to navigate and manoeuvre into difficult-to-reach spaces compared with conventional 6-axis robots, they suffer from low stiffness due to the flexibility of the compliant elements. This significantly limits features such as their load capability and the force/torque that can applied against the environment during the repair/inspection tasks. Furthermore, due to large backbone length to section diameter ratio (greater than 100:1 in some applications) and the presence of passive/non controllable sections the behaviour of the robots becomes akin to a cantilevered beam. As such, the deflection of the robot to where it should be causes significant position and navigation errors. Consequently, these kinds of snake-like continuum robots are usually limited to lightweight end-effectors and to tasks where no force is exchanged with the environment (e.g. camera inspections).

FIG. 2 presents an example of a means of overcoming the above listed issues according to the present disclosure. The figure presents a schematic of a continuum arm robot 202 entering an enclosed workspace 201. The continuum arm robot 202 forms part of a robotic system which incorporates both the continuum arm robot 202 itself, but also a slave robot system. The disclosure increases the stiffness and performance of robotic manipulators which, as discussed, have limited capabilities due to their deflection under loads. In order to overcome this limitation, the robotic system features a controllable holding platform that causes an interaction between the robotic system and the environment within which it is working. The holding platform is the joining section between the slave robot and the continuum arm section of the robot system. In FIG. 2 the holding platform is an auxiliary master robot for fixturing and in situ control of the slave robot based on an electromagnetic actuation system. In FIG. 2 the robotic system is inserted into a confined workspace 201 in order to perform the desired operation. Entry into the workspace 201 is provided through a limited access port 203; this port may be any suitable access port. For example, this may be a borescope hole on a gas turbine engine. The actuator (not shown) for controlling the robot system is located on the outside of the workspace 201. The continuum arm robot 202 is used to deliver the required process and tools into the workspace 201 through the access port 203. The continuum arm robot 202 consists of a passive section 204, that is to say a section that is not controllable, and an active section 205 which is controllable from the robot base or actuator. A movable master robot 206 (electromagnetic device) is used to fixture and control the continuum arm robot 202 remotely by way of an electromagnetic force. In order to do this a controllable electromagnetic actuator is attached to the master robot 206 and is used to control the continuum arm robot 202 through a ferromagnetic collar 207 as an example of a ferromagnetic section which is attached to the continuum arm robot 202. The ferromagnetic collar 207 may be coated so that it does not damage the surface of the workspace. This may be any suitable coating, for example, this coating may be Teflon. The ferromagnetic collar 207 or collars may be connected at any suitable point along the passive section 204. Any suitable number of collars may be used along the length of the passive section 204 or the active section 205. The electromagnetic controllers are external to the continuum arm robot 202 and are able to be controlled so that the robotic system is able to be used and accurately manipulated within a confined workspace 201 before the master robot 206 engages with the ferromagnetic collar 207 and lock the continuum arm robot 202 against the wall of the workspace 201. Such robotic systems may be used within a gas turbine engine or other restricted areas of aerospace engineering, also in the nuclear, telecoms or oil and gas industries. The robotic system can be inserted into the workspace 201 without an electromagnetic force imparted onto the robotic system. In such a case the continuum arm robot 202 is deployed and manipulated into position through the actuator manipulating the continuum arm robot 202. Once the robot tip is positioned in the correct position within an area of interest of the workspace 201 the robotic system can be fixed in place by switching on the electromagnetic controller to attract the continuum arm robot 202 and hold it against the wall. To do this the master robot 206 is positioned in a region outside of the workspace 201, which corresponds to the location of the ferromagnetic collar 207 on the continuum arm robot 202 within the workspace 201. The number of electromagnets used on the controller can either be one, or there may be a plurality of electromagnets. The use of a plurality of electromagnets overcomes issues relating to misalignment between the ferromagnetic collar 207 and the master robot 206. Once the electromagnets of the master robot 206 have been switched on the force of them engages with the ferromagnetic collar 207 and locks the continuum arm robot 202 in place within the workspace 201 against the wall. As a result of this the length of the free end of the robotic system is reduced and as such the deflection of the tip is reduced. Consequently, the accuracy of the tip is improved as is the load capacity of the tip. The repair process can therefore be undertaken and the reaction forces that this produces compensated for. Thus, the disclosure provides a fixturing and control method for a continuum arm robot 202 working within a confined space by using a master robot. The strength of the electromagnets may be any suitable strength so that it is able to securely engage the ferromagnetic collar 207 through the wall of the workspace 201. Depending on the thickness of the wall a stronger or weaker electromagnet may be employed. The electromagnet can be positioned on the outside of the workspace 201 either manually by an operator or positioned by a further suitable robotic device. The ferromagnetic collar 207 may be sized so that the continuum arm robot 202 can move within the workspace 201 This would be equivalent to curtain ring sliding over a curtain pole. This would allow the continuum arm robot 202 to be moved and positioned as well as rotated in order to perform the desired task. Alternatively, it can be a tight fit.

As an alternative to using a collar, as presented above, which could have the effect of increasing the diameter of the continuum arm robot 202. Instead, a disc 208 (see FIG. 4) or discs as an example of a ferromagnetic section can be machined from a ferromagnetic material. This will have the effect of keeping the diameter of the continuum arm robot 202 the same and as such reduce the chance of catching or snagging on insertion or extraction of the continuum arm robot 202. The continuum arm robot 202 can have more than one ferromagnetic disc within its spine. This could also be used in conjunction with a collar placed at a different point on the robot.

The disclosure provides a benefit by improving the stiffness and control of snake-like, continuum or similar robotic systems in a very quick manner. This is because the electromagnetic system can be quickly positioned and activated as well as deactivated. Therefore, the use of such a system does not greatly increase the time taken to perform the task but benefits the system by increasing the force that can be applied to the tip as well as the accuracy of the system. This is because it reduces the effect of the device acting like a cantilever-like beam. As the robotic system does not require a change apart from the addition of the collars it means that the structure of the robotic system is very simple. It also has no effect on the size of the robotic system and as such does not limit the access of the robotic system into and out of the confined space. This removes barriers of limited space for the design. Furthermore, the system provides better performance and stiffness than other prior art locking/stiffening mechanisms that are used inside the body of the robotic system. The ferromagnetic collars can be either included within the robotic system during the build phase. Alternatively, the ferromagnetic collars may be retrofitted onto an existing robotic system; this allows it to increase the performance of an existing robot.

As discussed above electromagnetic coupling can be controlled in an automated or manual way. For example, the master robot 206 can be located onto the casing by a manual operator so that the ferromagnetic collar 207 is locked into place. Alternatively, the master robot 206 can be moved across the surface by a small robot (e.g. wheeled) which is aware of where the ferromagnetic collar 207 is located; this is either by the operator knowing where the robotic system is or through appropriately programming the robot so that it can be directed into location. In order to assist in this positioning of the master robot 206 to the continuum arm robot 202 one or both may include sensors and feedback devices which can be used to determine where the master robot 206 is inside the engine. The controllable electromagnetic devices can be addressed to switch on and off remotely. The master robot 206 may also be moved by moving the external magnet and dragging the master robot 206 through the workspace.

In addition to the system of utilising a single electromagnetic device it is also possible to use a plurality of master robots 206 and ferromagnetic collars 207 in order to "pin" several the sections of the continuum arm robot 202. If such a system is used, then these electromagnets can be linked to a central control system so that they are switched on and off in a coordinated way. For example, section one can be switched off so that the tip sections are pushed into the workspace further, while another can be switched on so that there is some stiffness within the system. This could be used to manipulate the movement of the robot system akin to a caterpillar walking. As such, this can allow sections of the passive region to be moved into the environment without the overall system becoming too compliant.

Furthermore, the use of magnets can be used for other deployment platforms such as guide tubes within confined areas. In such a case the ferromagnetic collars can be retrofitted to these systems to allow them to be pinned inside a working environment.

The magnets described here could be designed in a multitude of different ways. For example, the magnets could be located on the outside of the robot arm or alternatively they could be located inside of the robot arm. Furthermore, there could be an array of magnets to help with alignment from the outside to the inside. Alternatively, the master robot 206 could instead of being part of a separate system be embedded within the walls of the workspace 201. In the example of a gas turbine engine this could be in a jet pipe of a defence engine, or along a path from a borescope. By positioning the magnets within the walls allows for easier deployment of the robot compared to an active/passive system. In order to improve the system especially if multiple magnets are used within the wall it is beneficial if the magnets can be switched on and off by a central control system. Through the use of an array of magnets positioned within the wall of the workspace it would be possible to provide the forward motion of the continuum arm robot system within the workspace by being switched on and off in a coordinated way. The use of embedded magnetic systems into a component could allow easy movement over long distances below the robot. This, or the use of an external magnet pulling the robot along would therefore increase the use of compliant robots into workspaces in which the target area is a long way from the port and therefore this increases the number of industries in which these robots can be deployed in. It also allows for the use of thinner robots to be used within these areas, because they can access further than traditional systems and the increase in strength means that the robot can perform more challenging tasks. As such it would be more equivalent to a thicker cross-sectioned robot.

FIG. 3 presents a flow chart of the operation of the continuum arm robot 202 of the present disclosure. Step 1 301 comprises inserting the continuum arm robot 202 into the workspace 201 through an access port 203. Step 2 302 comprises moving the continuum arm robot 202 into and further into the workspace 201 and positioning it. The movement and positioning may be performed by addressing the controllable electromagnetic devices so as to pull the continuum arm robot 202 through the workspace 201. Sensors and feedback devices such as those discussed above may be used to inform an operator of the position of the continuum arm robot 202, so that they know when to engage the controllable electromagnetic devices. Step 3 303 with the continuum arm robot 202 in position the controllable electromagnetic devices are activated so as to lock the compliant robot in position against the wall of the workspace 201. If the electromagnetic device has been used to pull the continuum arm robot 202 then in this case it is just stopped in position. Step 4 304 the continuum arm robot 202 performs its desired task. Step 5 305 the controllable electromagnetic devices are deactivated so that the continuum arm robot 202 is no longer locked against the wall of the workspace 201. Step 6 306 the continuum arm robot 202 is removed from the workspace 201.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A robot system comprising:
a continuum arm robot having a manipulatable tip, the continuum arm robot including at least one ferromagnetic section; and
at least one external controllable electromagnetic device which can be activated so that the at least one ferromagnetic section on the continuum arm robot is attachable to the at least one external controllable electromagnetic device only via a magnetic attraction between the at least one ferromagnetic section and the at least one external controllable electromagnetic device.

2. The robot system according to claim 1, wherein the at least one ferromagnetic section is a disc in the continuum arm robot.

3. The robot system according to claim 1, wherein the at least one ferromagnetic section is a collar.

4. The robot system according to claim 3, wherein the collar has a coating.

5. The robot system according to claim 1, wherein the at least one external controllable electromagnetic device is configured to be positioned by an operator.

6. The robot system according to claim 1, wherein the at least one external controllable electromagnetic device is configured to be positioned by a further controllable robotic device.

7. The robot system according to claim 1, wherein the at least one external controllable electromagnetic device is capable of being located within a wall of a workspace.

8. The robot system according to claim 1, wherein the at least one external controllable electromagnetic device comprises a plurality of external controllable electromagnetic devices spaced apart and are individually addressable.

9. The robot system according to claim 8, wherein the plurality of external controllable electromagnetic devices are configured so that a switching on and off of the plurality of external controllable electromagnetic devices provides a force that pulls the continuum arm robot through a workspace by progressively switching on the plurality of external controllable electromagnetic devices.

10. The robot system according to claim 1, wherein the at least one ferromagnetic section is configured to be retrofitted onto a pre-existing continuum arm robot.

11. The robot system comprising according to claim 1, wherein:
the at least one ferromagnetic section is a plurality of ferromagnetic collars positioned along a passive section of the continuum arm robot and the at least one external controllable electromagnetic device is a plurality of external controllable electromagnetic devices, each ferromagnetic collar is associated with a respective external controllable electromagnetic device so that, when the plurality of external controllable electromagnetic devices are activated, the passive section of the continuum arm robot is locked in multiple locations.

12. The robot system according to claim 1, wherein the at least one external controllable electromagnetic device is configured to be remotely controlled.

13. A method of fixing the robot system according to claim 1, the method comprising:

inserting the continuum arm robot into a workspace through an access port;

positioning the tip of the continuum arm robot to an area within the workspace to be addressed;

activating the at least one external controllable electromagnetic device that is located outside of the workspace to attract and lock the continuum arm robot against the wall of the workspace, performing a desired task with the continuum arm robot;

deactivating the at least one external controllable electromagnetic device to release the continuum arm robot;

removing the continuum arm robot from the workspace.

14. The method of claim 13, wherein the at least one external controllable electromagnetic device is a plurality of external controllable electromagnetic devices, and the positioning is performed by addressing the plurality of external controllable electromagnetic devices, so that they are able to pull the continuum arm robot through the workspace to the desired location.

* * * * *